(12) United States Patent
Sridhar

(10) Patent No.: US 9,781,146 B2
(45) Date of Patent: Oct. 3, 2017

(54) METHOD AND DEVICE FOR EVALUATING SECURITY ASSESSMENT OF AN APPLICATION

(71) Applicant: Wipro Limited, Bangalore (IN)

(72) Inventor: Kavitha Sridhar, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/814,912

(22) Filed: Jul. 31, 2015

(65) Prior Publication Data

US 2016/0373480 A1 Dec. 22, 2016

(30) Foreign Application Priority Data

Jun. 18, 2015 (IN) ............................. 3057/CHE/2015

(51) Int. Cl.
*H04L 29/06* (2006.01)
*G06F 21/57* (2013.01)

(52) U.S. Cl.
CPC ........ *H04L 63/1433* (2013.01); *G06F 21/577* (2013.01); *H04L 63/1441* (2013.01); *G06F 2221/033* (2013.01)

(58) Field of Classification Search
CPC ............. G06F 21/577; G06F 2221/033; H04L 63/1433; H04L 63/1441
See application file for complete search history.

(56) References Cited

U.S. PATENT DOCUMENTS

| | | | |
|---|---|---|---|
| 8,499,353 B2 | 7/2013 | Lockhart et al. | |
| 8,510,571 B1 * | 8/2013 | Chang | G06F 21/54 713/187 |
| 8,701,198 B2 | 4/2014 | Greene et al. | |
| 8,881,293 B1 * | 11/2014 | Brucker | G06F 21/577 717/126 |
| 2011/0173693 A1 * | 7/2011 | Wysopal | G06F 11/3612 726/19 |
| 2011/0191855 A1 * | 8/2011 | De Keukelaere | G06F 11/00 726/25 |

(Continued)

FOREIGN PATENT DOCUMENTS

| | | |
|---|---|---|
| WO | WO 2014/041561 | 3/2014 |
| WO | WO 2014/133528 | 9/2014 |

OTHER PUBLICATIONS

Huang, Y.W., Yu, F., Hang, C., Tsai, C.H., Lee, D.T. and Kuo, S.Y., May 2004. Securing web application code by static analysis and runtime protection. In Proceedings of the 13th international conference on World Wide Web (pp. 40-52). ACM.*

(Continued)

*Primary Examiner* — James Turchen
(74) *Attorney, Agent, or Firm* — Finnegan, Henderson, Farabow, Garrett & Dunner LLP

(57) ABSTRACT

Embodiments of the present disclosure disclose a method and a device for evaluating security assessment of an application. The method comprises receiving application entry data associated with a plurality of entry points of the application. Also, the method comprises identifying at least one security threat entry point based on the application entry data. Further, the method comprises computing a coverage index value based on the application entry data and the at least one security threat entry point and generating a recommendation report indicating security coverage of the application based on the coverage index value.

16 Claims, 4 Drawing Sheets

(56) References Cited

U.S. PATENT DOCUMENTS

| | | | | |
|---|---|---|---|---|
| 2012/0011578 | A1* | 1/2012 | Hinton | H04L 63/0815 726/8 |
| 2012/0072968 | A1* | 3/2012 | Wysopal | G06F 11/3612 726/1 |
| 2012/0210434 | A1* | 8/2012 | Curtis | G06F 21/577 726/25 |
| 2013/0097706 | A1 | 4/2013 | Titonis et al. | |
| 2013/0312092 | A1* | 11/2013 | Parker | H04L 63/1408 726/22 |
| 2014/0059690 | A1* | 2/2014 | Li | G06F 21/577 726/25 |
| 2014/0298294 | A1* | 10/2014 | Mahamuni | G06F 8/75 717/123 |
| 2014/0380486 | A1* | 12/2014 | Brucker | G06F 21/577 726/25 |
| 2015/0013011 | A1* | 1/2015 | Brucker | G06F 21/577 726/25 |
| 2015/0121532 | A1* | 4/2015 | Barel | G06F 21/577 726/25 |
| 2015/0195181 | A1* | 7/2015 | Birmiwal | H04L 43/50 709/224 |
| 2015/0205649 | A1* | 7/2015 | Bohm | G06F 9/547 719/330 |
| 2015/0242636 | A1* | 8/2015 | Khan | G06F 21/577 726/25 |
| 2015/0288705 | A1* | 10/2015 | Ligman | H04L 63/20 726/1 |
| 2015/0309813 | A1* | 10/2015 | Patel | G06F 8/75 703/22 |
| 2015/0371047 | A1* | 12/2015 | Mendelev | G06F 21/563 726/25 |
| 2016/0180096 | A1* | 6/2016 | Sharma | G06F 21/577 726/25 |
| 2016/0182553 | A1* | 6/2016 | Tripp | G06N 99/005 726/25 |
| 2016/0217288 | A1* | 7/2016 | Serrano | G06F 21/577 |
| 2017/0200006 | A1* | 7/2017 | Gershoni | G06Q 10/0635 |

OTHER PUBLICATIONS

Bartel, A., Klein, J., Le Traon, Y. and Monperrus, M., Sep. 2012. Automatically securing permission-based software by reducing the attack surface: An application to android. In Proceedings of the 27th IEEE/ACM International Conference on Automated Software Engineering (pp. 274-277). ACM.*

European Search Report issued Sep. 6, 2016 in European Patent Office in counterpart European Patent No. Application 15201794.3. 6 pages.

* cited by examiner

METHOD AND DEVICE FOR EVALUATING SECURITY ASSESSMENT OF AN APPLICATION

PRIORITY CLAIM

This U.S. patent application claims priority under 35 U.S.C. §119 to India Application No. 3057/CHE/2015, filed Jun. 18, 2015. The entire contents of the aforementioned application are incorporated herein by reference.

TECHNICAL FIELD

The present subject matter is related, in general to security assessment of an application and more particularly, but not exclusively to systems and methods for evaluating security assessment of an application.

BACKGROUND

Conventionally, enterprise applications are secured by at least one of physical security, network security and access control. Recently, with the increase number of applications moving in to the cloud and internet, application security became a prime aspect that has to be addressed. This has given rise for a need of application security assessment. The enterprise applications may be assessed using Static Application Security Testing (SAST) of source code for programming patterns that could be vulnerable to security threats. Also, the enterprise applications may be also assessed using Dynamic Application Security Testing (DAST) of a running application. However., many security-analysis techniques require significant time and resources to administer, not every application necessitates the same level or degree of analysis.

The enterprise applications could be standalone, client-server or web based applications. There are some security threats from which, the enterprise application has to be protected such as, but not limited to, user Interface, web interface or website, which could be built using HTML, CSS, JavaScript; database, interfaces such as REST, SOAP, message queues; web services; role based access, authentication mechanism; files, directories and logs.

In one conventional approach, automated security checks are performed by comparing an enterprise application against hypothetical set of uniform security standards. However, existing security software fail to estimate of security coverage of enterprise application.

SUMMARY

In one embodiment of the present disclosure, a method for evaluating security assessment of an application is provided. The method comprises receiving application entry data associated with a plurality of entry points of the application. Further, the method comprises identifying at least one security threat entry point based on the application entry data. Further, the method comprises computing a coverage index value based on the application entry data and the at least one security threat entry point. The method further comprises generating a recommendation report indicating security coverage of the application based on the coverage index value.

In another embodiment of the present disclosure, a security assessment computing device for evaluating security assessment of an application is provided. The security assessment computing device comprises a processor and a memory communicatively coupled to the processor. The memory stores processor-executable instructions, which, on execution, cause the processor to perform operations comprising receiving application entry data associated with a plurality of entry points of the application. The operations further comprise identifying at least one security threat entry point based on the application entry data. The operations further comprises computing a coverage index value based on the application entry data and the at least one security threat entry point. The operations further comprise generating a recommendation report indicating security coverage of the application based on the coverage index value.

In another embodiment of the present disclosure, a non-transitory computer readable medium for evaluating security assessment of an application is disclosed. The non-transitory computer readable medium includes instructions stored thereon that when processed by a processor causes a device to perform operations comprising receiving application entry data associated with a plurality of entry points of the application. The operations further comprise identifying at least one security threat entry point based on the application entry data. The operations further comprise computing a coverage index value based on the application entry data and the at least one security threat entry point. The operations further comprise generating a recommendation report indicating security coverage of the application based on the coverage index value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

DETAILED DESCRIPTION

Figure 1:
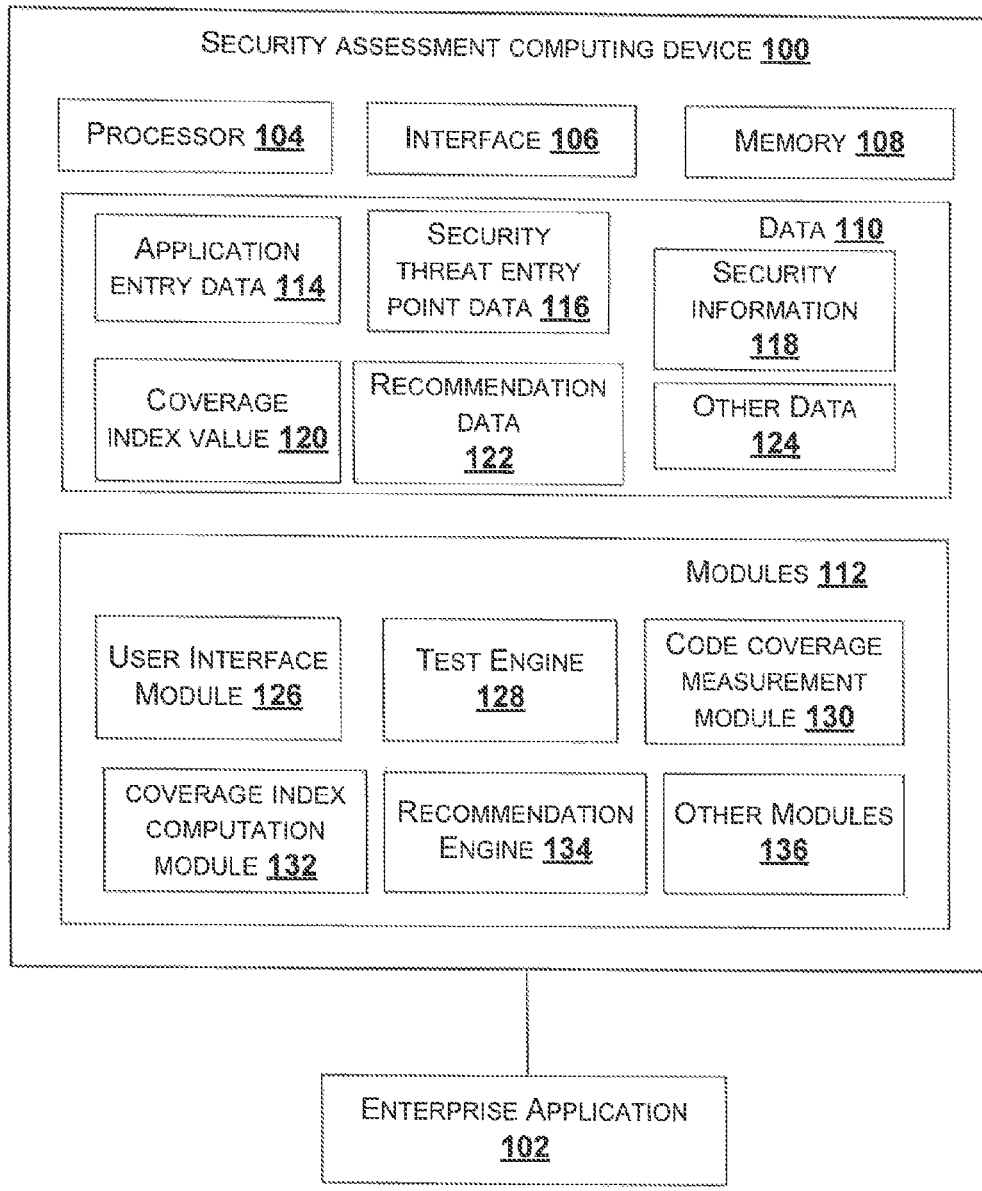
FIG. 1 illustrates a block diagram of an exemplary security assessment computing device for evaluating security assessment of an application in accordance with some embodiments of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

Embodiments of the present disclosure are related to a method and a computing device for evaluating security assessment of an application. The device receives application entry data associated with a plurality of entry points of the application and identifies at least one security threat entry point based on the application entry data to compute a coverage index value. Further, the device generates a recommendation report indicating security coverage of the application based on the coverage index value.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates a block diagram of an exemplary security assessment computing device or security assessment device 100 for evaluating security assessment of an application in accordance with some embodiments of the present disclosure. The security assessment device 100 is communicatively connected to an enterprise application 102. It may be noted that the security assessment device 100 may be communicatively connected to a plurality of enterprise application simultaneously.

The security assessment device 100 may include at least one central processing unit ("CPU" or "processor") 104 and a memory 108 storing instructions executable by the at least one processor 104. The processor 104 may comprise at least one data processor for executing program components for executing user- or system-generated requests. A user may be a person accessing the security assessment device 100 and/or the enterprise applications 102 such as those included in this disclosure, or such a device itself. The memory 108 is communicatively coupled to the processor 104. In an embodiment, the memory 108 stores application entry data being received by a user. The compliance management device 100 further comprises an I/O interface 106. The I/O interface 106 is coupled with the processor 104 through which the input is received.

In an embodiment, one or more data 110 may be stored within the memory 108. The one or more data 110 may include, for example, application entry data 114, security threat entry point data 116, security information 118, coverage index value 120, recommendation data 122 and other data 124.

The application entry data 114 is an input associated with an application also referred as enterprise application. In one embodiment, the input is provided by a user, for a predefined set of questions about one or more technologies used for at least one of building the application, deployment architecture of an application and application exposing interfaces that are leveraged by the other applications. The input is provided by the user through one of a user interface (UI) or a graphical user interface (GUI) also referred as application learning UI module.

In one embodiment, the application entry data is received from a multiple entities such as, but not limited to, build web interface and web services. This application entry data is automated data. The application entry data further comprises receiving results of at least one of a static application security testing (SAST), a dynamic application security testing (DAST), a functionality test cases testing and a web services testing.

The security threat entry point data 116 is associated with the entry points, from amongst the plurality of entry points, which have to be tested or which are not being tested. In one embodiment, the security threat entry point data 116 are identified by analyzing the application entry data based on results of at least one of a static application security testing (SAST), a dynamic application security testing (DAST), a functionality test cases testing, and a web services testing to obtain security information 118. The security information 118 is used for identifying the at least one security threat entry point, wherein entry points, from amongst the plurality of entry points, which are to be tested are the security threat entry points.

The entry points are interfaces that may be assessed by a user. In an example, the entry points may be at least one of web interfaces that can be assessed by other applications, logs, files and folders that may be assessed by the user. The entry points are extracted by scanning dump of source code, from code coverage results and the application learning UI. The entry point information is the base for evaluating the coverage of the assessment and determining the residual risk.

The coverage index value 120 is generated based on the application entry data and the at least one security threat entry point. In an example, the coverage index value may be computed by performing arithmetic division of a number of the at least one security threat points by a number of the entry points.

In an example embodiment, the security threat entry point may be at least one a web interface, a web service, a database, an interface, and an authentication mechanism. The web service may be at least one of Web Services Description Language (WSDL), and JavaScript Object Notation (JSON). In an example, let total number of entry point determined by entry point scan and application learning UI is N. Also, let the number of security threat entry points for the web interface is count A, and let the count be B for web services interfaces. The database is selected from at least one of number of schemas and users configured. The coverage index value is obtained by performing arithmetic division of the sum of A and B by N.

The recommendation data 122 is generated using the coverage index value. A recommendation report is generated using the recommendation data 122 that also comprises the application entry data associated with a plurality of entry points of the application, the coverage index value one or more security threat entry points to be secured.

In an embodiment, the data 110 in the memory 108 is processed by the modules 112 of the processor 104. The modules 1.12 may be stored within the memory 108. Also, the modules 112 can be implemented in any suitable hardware, software, firmware, or combination thereof.

In one implementation, the modules 112 may include, for example, a user interface module 126, a test engine 128, a code coverage measurement module 130, a coverage index computation module 132, a recommendation engine 134, and other modules 136. The compliance management computing device 100 may also comprise, other modules 134 to perform various miscellaneous functionalities of the device 100. It will be appreciated that such aforementioned modules may be represented as a single module or a combination of different modules.

In an embodiment, the user interface (UI) module 126 receives input data or application entry data 114 of an enterprise application 102 or also referred as an application. The user interface module 126 is also referred as an application learning user interface module. The application entry data 114 is received through a graphical user interface (GUI) or UI of the security assessment computing device, from a user of the application. The GUI presents a set of questions related to the security of the application, to understand the technologies which the user inputs the required information. The application entry data 114 comprises at least one of data associated with one or more technologies used for building the application, architecture data of the application, and data pertaining to interface of the application.

The user interface module 126 receives information on the application from multiple entities. The UI module also receives information from test engine 128 or also referred as test engine module. The test engine 128 comprises a static application security testing (SAST), dynamic application security testing (DAST), web services test data generation and functionality test cases. In SAST, the test engine 128 performs testing of the application by examining at least one of source code, byte code or application binaries of the application, for conditions indicative of a security vulnerability. In DAST, the test engine 128 performs testing of the application by examining the application in its running state.

The code coverage measurement module 130 computes the coverage index by dividing number of entry points tested by a number of security threat entry points such as, but not limited to web interfaces, web services, files, folders and database. In one embodiment, the code coverage measurement module 130 is configured to determine code coverage from security perspective. The code coverage measurement module 130 also scans through the folder contains source code and identifies all the potential entry points. Following is an example embodiment illustrating a processing of identifying the entry points:

From the SAST, the list of entry points identified be collected as *.jsp files.
From web services testing, a list of web interfaces collected as *.WSDL.
From the DAST, list of user entry points, web services, users/roles etc. covered using the code coverage tools is obtained.

The coverage index computation module 132 is configured to compute the coverage index by performing arithmetic division of a number of the at least one security threat points by a number of the entry points. The security threat entry points are such as, but not limited to, web interfaces, web services, files, folders, and database.

Coverage Index=Number of entry points tested/Total number of entry points

Figure 2:
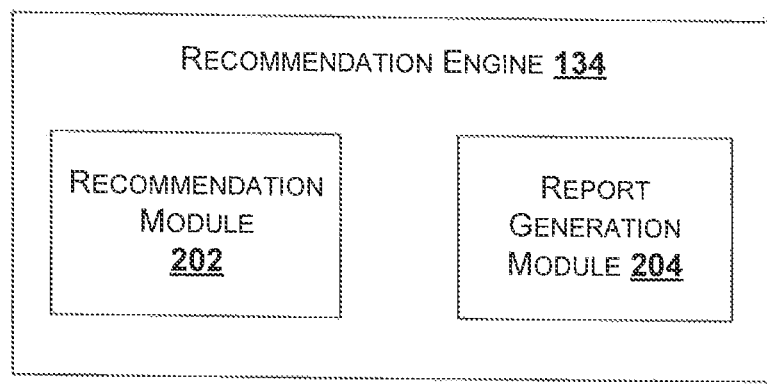
FIG. 2 illustrates an exemplary block diagram of a recommendation engine in accordance with some embodiments of the present disclosure.

The recommendation engine or module 134, receives the coverage index value from the coverage index computation module 132. The sub modules of the recommendation engine 134 are illustrated in FIG. 2. The sub modules of the recommendation engine 130 comprise a recommendation module 202 and a report generation module 204.

The recommendation module 202 receives the coverage index value 120 generated by the coverage index computation module 132 as input. The recommendation module 202 analyzes the coverage index value 120 and generates a recommendation about the security assessment of the application. The report generation module 204 generates a recommendation report based on the recommendation about the security assessment of the application. The recommendation report comprises application entry data associated with a plurality of entry points of the application, the coverage index value one or more security threat entry points to be secured.

In one embodiment., the recommendation module 202 is configured to provide recommendations to a client or user regarding security coverage of the enterprise application based on the analysis performed by code coverage measurement module 130 and coverage index compute module 132. The report generation module 204 provides the report about the residual risk and a list of areas that are not protected in the enterprise application. The recommendation engine 134 also transmits the recommendation to the user or client.

Figure 3:
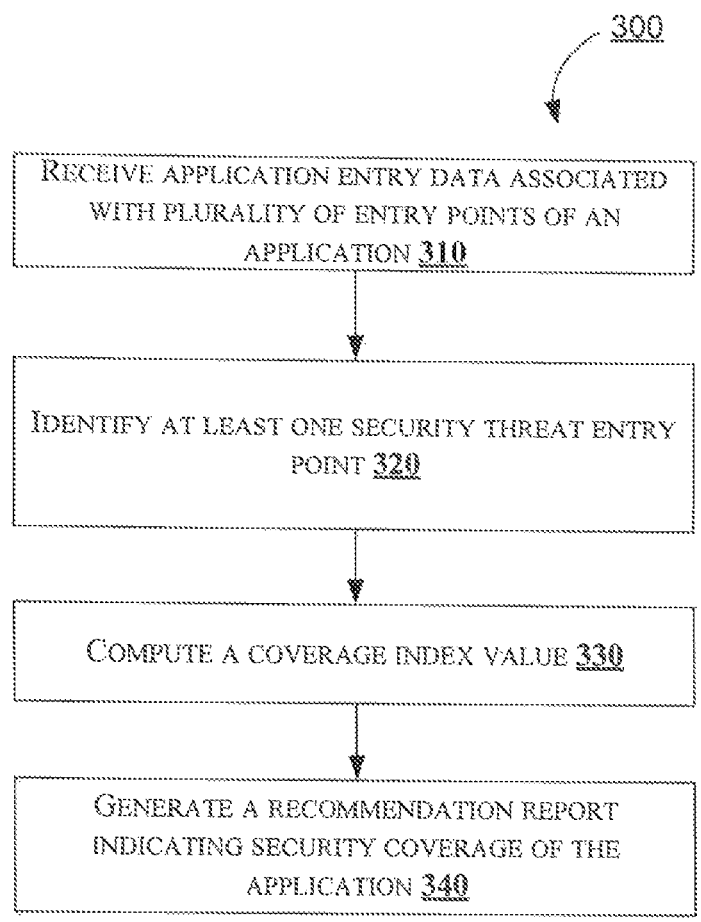
FIG. 3 illustrates an exemplary method for evaluating security assessment of an application in accordance with some embodiments of the present disclosure.

FIG. 3 illustrates an exemplary method for evaluating security assessment of an application in accordance with some embodiments of the present disclosure.

As illustrated in FIG. 3, the method 300 comprises one or more blocks for evaluating security assessment of an application. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 310, receive application entry data associated with a plurality of entry points of the application. In an embodiment, the user interface (UI) module 126 receives application entry data 114 of an enterprise application 102. The application entry data 114 is received through a graphical user interface (GUI) of the security assessment computing device, from a user of the application for a set of questions related to the security of the application. The application entry data 114 comprises at least one of data associated with one or more technologies used for building the application, architecture data of the application, and data pertaining to interface of the application.

At block 320, identify at least one security threat entry point based on the application entry data. The security threat entry point data 116 is associated with the entry points, from amongst the plurality of entry points, which have to be tested or which are not being tested. In one embodiment, the security threat entry point data 116 are identified by analyzing the application entry data based on results of at least one of a static application security testing (SAST), a dynamic application security testing (DAST), a functionality test cases testing, and a web services testing to obtain security information 118. The security information 118 is used for identifying the at least one security threat entry point, wherein entry points, from amongst the plurality of entry points, which are to be tested are the security threat entry points.

At block 330, compute a coverage index value based on the application entry data and the at least one security threat entry point. In one embodiment, the coverage index computation module 132 computes the coverage index value by performing arithmetic division of the at least one security threat points by a number of the entry points.

At block 340, generate a recommendation report indicating security coverage of the application based on the coverage index value. The recommendation engine 134 receives the coverage index value 120 generated by the coverage index computation module 132 as input, to analyze the coverage index value 120 and generate a recommendation report about the security assessment of the application. The recommendation report comprises application entry data associated with a plurality of entry points of the application, the coverage index value one or more security threat entry points to be secured.

Thus, the method and the device provide evaluating security assessment of an application. In an embodiment, the present disclosure provides real-time validation of one or more configuration changes and identification of compliance violations which helps in preventing the possible damages from wrong/insecure configurations. Also, the present disclosure certifies an application on possible residual risk security.

Computer System

Figure 4:
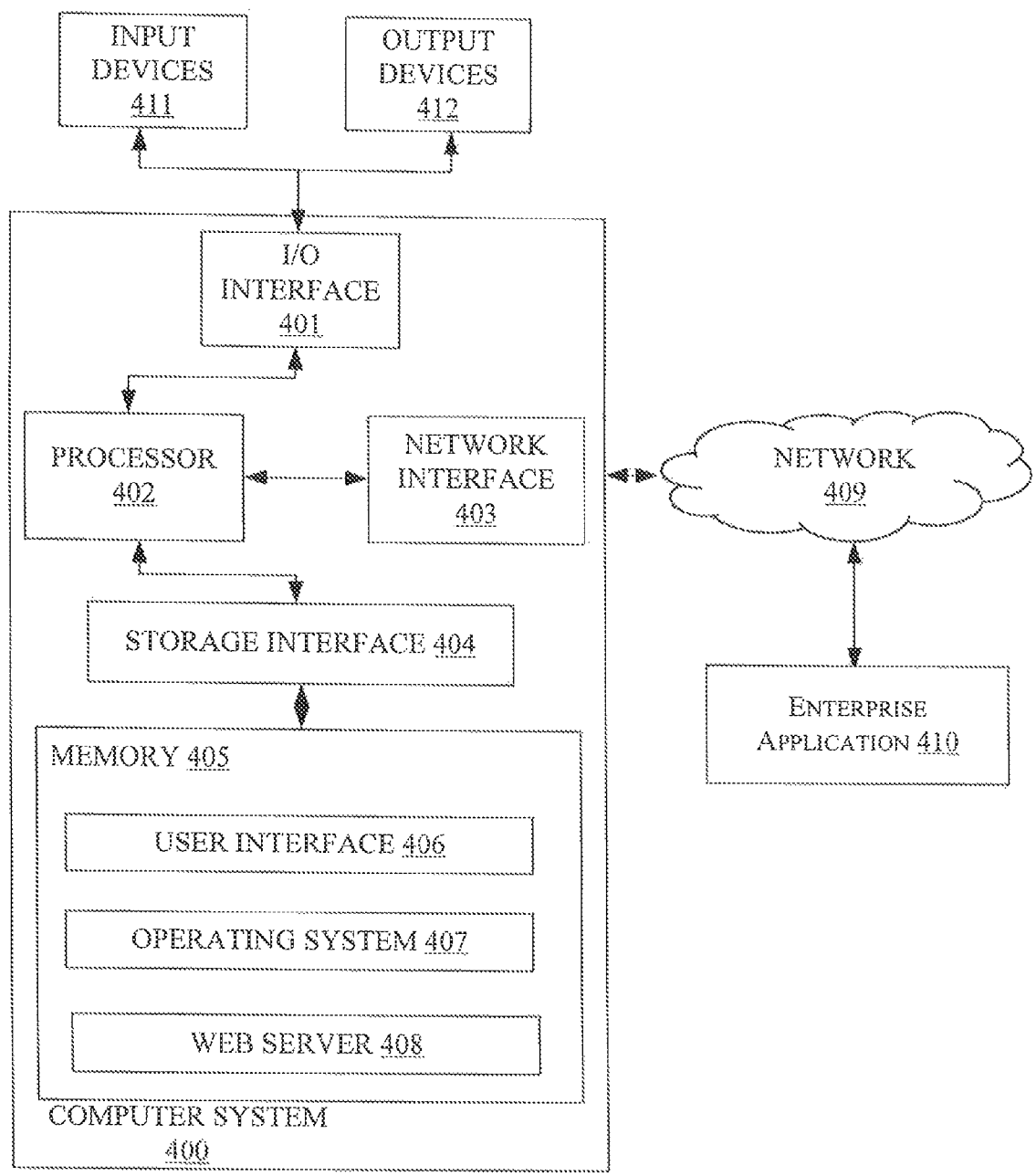
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 is used to implement the security assessment computing device 100. The computer system 400 is fix evaluating security assessment of an application. The computer system 400 may comprise a central processing unit ("CPU" or "processor") 402. The processor 402 may comprise at least one data processor for executing program components for executing user- or system-generated business processes. A user may include a person, a person using a device such as such as those included in this disclosure, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 401, the computer system 400 may communicate with one or more I/O devices (411 and 412). For example, the input device 411 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 412 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 409 may include, without limitation, a direct interconnection, local area network (LAN), wide area network (WAN), wireless network (e.g., using Wireless Application Protocol), the Internet, etc. Using the network interface 403 and the communication network 409, the computer system 400 may communicate with an enterprise application 410.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, computer system 400 may store user/application data 406, such as the data, variables, records, etc. as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc,), Unix X-Windows, web interface libraries (e.g., ActiveX, Java, Javascript, AJAX, HTML, Adobe Flash, etc.), or the like.

In some embodiments, the computer system 409 may implement a web browser 408 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 400 may implement a mail server stored program component. The mail server may be an Internet mail server such as Microsoft Exchange, or the like. The mail server may utilize facilities such as ASP, ActiveX, ANSI C++/C#, Microsoft .NET. CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium." should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Advantages of the embodiment of the present disclosure are illustrated herein.

In an embodiment, the present disclosure provides realtime validation of one or more configuration changes and identification of compliance violations which helps in containing/preventing the possible damages from wrong/ insecure configurations.

In an embodiment, the present disclosure certifies an application on residual risk security.

The described operations may be implemented as a method, system or article of manufacture using, standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals:

| Reference Number | Description |
| --- | --- |
| 100 | Security Assessment computing device |
| 102 | Enterprise Application |
| 104 | Processor |
| 106 | Interface |
| 108 | Memory |
| 110 | Data |
| 112 | Modules |
| 114 | Application entry data |
| 116 | Security Threat Entry Point Data |
| 118 | Security Information |
| 120 | Coverage Index Value |
| 122 | Recommendation Data |
| 124 | Other Data |
| 126 | User Interface Module |
| 128 | Test Engine |
| 130 | Code Coverage Measurement Module |
| 132 | Coverage Index Computation Module |
| 134 | Others Modules |
| 202 | Recommendation Module |
| 204 | Report Generation Module |
| 500 | Computer System |
| 501 | I/O Interface |
| 502 | Processor |
| 503 | Network Interface |
| 504 | Storage Interface |
| 505 | Memory |
| 506 | User Interface Application |
| 507 | Operating System |
| 508 | Web Browser |
| 510 | Enterprise Application |
| 511 | Input Device |
| 512 | Output Device |

I claim:

1. A method for evaluating security assessment of an application, comprising:
   receiving, by a security assessment computing device, application entry data associated with a plurality of entry points of the application;
   identifying, by the security assessment computing device, at least one security threat entry point based on the application entry data, by
      analyzing the application entry data based on results of a static application security testing (SAST), a dynamic application security testing (DAST), a functionality test cases testing, and a web services testing to obtain security information, wherein the application data entry comprises at least one of data of one or more technologies used for building the application, architecture data of the application, or data pertaining to interface of the application, and
      identifying the at least one security threat entry point based on the security information, wherein entry points, from amongst the plurality of entry points, which are to be tested are the security threat entry points,
   wherein the application entry data is received through a graphical user interface of the security assessment computing device from a user of the application;
   computing, by the security assessment computing device, a coverage index value based on the application entry data and the at least one security threat entry point, wherein the coverage index value is computed by performing arithmetic division of a number of the at least one security threat entry point by a total number of the entry points in the plurality of entry points of the application; and
   generating, by the security assessment computing device, a recommendation report indicating security coverage of the application based on the coverage index value.

2. The method as claimed in claim 1, wherein the application entry data comprises at least one of data associated with one or more technologies used for building the application, architecture data of the application, or data pertaining to interface of the application.

3. The method as claimed in claim 1, wherein receiving the application entry data further comprises receiving results of the SAST, DAST, the functionality test cases testing, and the web services testing.

4. The method as claimed in claim 1, wherein the plurality of entry points is at least one of a build web interface, a database, or one or more web services.

5. The method as claimed in claim 1, wherein the recommendation report comprises application entry data associated with a plurality of entry points of the application, the coverage index value, and one or more security threat entry points to be secured.

6. A security assessment computing device for evaluating security assessment of an application, comprising:
   a processor; and
   a memory communicatively coupled to the processor, wherein the memory stores processor-executable instructions, which, on execution, cause the processor to:
      receive application entry data associated with a plurality of entry points of the application;
      identify at least one security threat entry point based on the application entry data by:
         analyzing the application entry data based on results of a static application security testing (SAST), a dynamic application security testing (DAST), a functionality test cases testing, and a web services testing to obtain security information, wherein the application data entry comprises at least one of data of one or more technologies used for building the application, architecture data of the application, or data pertaining to interface of the application, and
         identifying the at least one security threat entry point based on the security information, wherein entry points, from amongst the plurality of entry points, which are to be tested are the security threat entry points, wherein the application entry data is received through a graphical user interface of the security assessment computing device from a user of the application;

compute a coverage index value based on the identify of at least one security threat entry point based on the application entry data, wherein the coverage index value is computed by performing arithmetic division of a number of the at least one security threat entry point by a total number of the entry points in the plurality of entry points of the application; and generate a recommendation report indicating security coverage of the application based on the coverage index value.

7. The device as claimed in claim 6, wherein the application entry data comprises at least one of data associated with one or more technologies used for building the application, architecture data of the application, or data pertaining to interface of the application.

8. The device as claimed in claim 6, wherein the processor is configured to receive the application entry data by receiving results of the SAST, the DAST, the functionality test cases testing, and the web services testing.

9. The device as claimed in claim 6, wherein the plurality of entry points is at least one of a build web interface, a database, or one or more web services.

10. The device as claimed in claim 6, wherein the recommendation report comprises application entry data associated with a plurality of entry points of the application, the coverage index value, and one or more security threat entry points to be secured.

11. The device as claimed in claim 6, wherein the processor is further configured to generate a security assessment report based on at least one of the data associated with entry points of the application, the coverage index value, or the recommendation.

12. A non-transitory computer readable medium including instructions stored thereon that when processed by at least one processor cause a system to perform operations comprising:

receiving application entry data associated with a plurality of entry points of the application;

identifying at least one security threat entry point based on the application entry data, by analyzing the application entry data based on results of a static application security testing (SAST), a dynamic application security testing (DAST), a functionality test cases testing, and a web services testing to obtain security information, wherein the application data entry comprises at least one of data of one or more technologies used for building the application, architecture data of the application, or data pertaining to interface of the application, and identifying the at least one security threat entry point based on the security information, wherein entry points, from amongst the plurality of entry points, which are to be tested are the security threat entry points, wherein the application entry data is received through a graphical user interface of the security assessment computing device from a user of the application;

computing a coverage index value based on the application entry data and the at least one security threat entry point, wherein the coverage index value is computed by performing arithmetic division of a number of the at least one security threat entry point by a total number of the entry points in the plurality of entry points of the application; and generating, by the security assessment computing device, a recommendation report indicating security coverage of the application based on the coverage index value.

13. The medium as claimed in claim 12, wherein receiving the application entry data comprises receiving results of the SAST, the DAST, the functionality test cases testing, and the web services testing.

14. The medium as claimed in claim 12, wherein the operations further comprise generating the recommendation report comprising application entry data associated with a plurality of entry points of the application, the coverage index value, and one or more security threat entry points to be secured.

15. The medium as claimed in claim 12, wherein the plurality of entry points is at least one of a build web interface, a database, or one or more web services.

16. The medium as claimed in claim 12, wherein the operations further comprise generating a security assessment report based on at least one of the data associated with entry points of the application, the coverage index value, or the recommendation.

* * * * *